US006757624B1

(12) United States Patent
Hwang et al.

(10) Patent No.: US 6,757,624 B1
(45) Date of Patent: Jun. 29, 2004

(54) SYNTHETIC PRESSURE ALTITUDE DETERMINING SYSTEM AND METHOD OF INTEGRITY MONITORING FROM A PRESSURE SENSOR

(75) Inventors: Patrick Y. Hwang, Marion, IA (US); Gary A. McGraw, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/308,621

(22) Filed: Dec. 3, 2002

(51) Int. Cl.[7] .............................................. G01L 7/00
(52) U.S. Cl. ........................................................ 702/50
(58) Field of Search .............................. 702/47, 50, 98, 702/138, 166, 137; 701/4, 10, 213

(56) References Cited

PUBLICATIONS

"A Gradient Wind Error Model For The Blanchard Algorithm", by K. Hayward and L. Stephenson, Northrop Grumman, Integrated Systems. 2002, IEEE, pp. 254–262.
"A New Algorithm For Computing Intertial Altitude and Vertical Velocity", by R. Blanchard. IEEE Transactions on Aerospace and Electronics Systems, vol. AES–7, No. 6, Nov. 1971.
"Pressure And Blanchard Altitudes Computed From Atmospheric Data Gathered From May Through Jul. 2000 at White Sands, New Mexico", by T. Li and D. Thunborg, Northrop Grumman, Guidance and Control Systems. ION 57th Annual Meeting/CIGTF 20th Biennial Guidance Test Symposium, Jun. 2001, Albuquerque, NM, pp. 325–333.

"An Improvement To An Algorithm For Computing Aircraft Reference Altitude", by R. Blanchard. IEEE Transactions on Aerospace and Electronics Systems, Sep. 1972.

Co–pending U.S. patent applicaiton Docket No. 03CR071/KE "Synthetic Pressure Altitude Determining System and Method Using Integrity Monitoring From a Pressure Sensor With Wind Correction" by Patrick Y. Hwang which is being filed on the same day herewith, Dec. 3, 2002.

Co–pending U.S. patent application Docket No. 02CR327/KE "Synthetic Pressure Altitude Determining System and Method" by Gary A. McGraw and Douglas A. Bell which is being filed on the same day herewith, Dec. 3, 2002.

*Primary Examiner*—Michael Nghiem
(74) *Attorney, Agent, or Firm*—Nathan O. Jensen; Kyle Eppele

(57) ABSTRACT

A method of generating a synthetic pressure altitude is disclosed. The method includes providing a static air temperature to a data processing device. The method also includes receiving a geometric altitude from a geometric altitude sensing device and performing a numerical integration based on the static air temperature and the geometric altitude resulting in a synthetic pressure altitude. The method further includes receiving a pressure altitude from a pressure altitude sensing device, comparing the pressure altitude and the synthetic pressure altitude and generating an average of the pressure altitude and the synthetic pressure altitude. The method still further includes providing selectively, based on the comparing step, the average as output.

21 Claims, 7 Drawing Sheets

SYNTHETIC PRESSURE ALTITUDE DETERMINING SYSTEM AND METHOD OF INTEGRITY MONITORING FROM A PRESSURE SENSOR

CROSS-REFERENCE TO RELATED PATENT APPLICATIONS

This application relates to U.S. patent application Ser. No. 10/308,755, entitled SYNTHETIC PRESSURE ALTITUDE DETERMINING SYSTEM AND METHOD, and U.S. patent application Ser. No. 10/308,422, entitled SYNTHETIC PRESSURE ALTITUDE DETERMINING SYSTEM AND METHOD WITH WIND CORRECTION, each of which is filed on the same day therewith.

BACKGROUND

Reduced Vertical Separation Minima (RVSM) requirements dictate substantial improvements in air-data systems and aircraft installation and maintenance. RVSM airspace is any airspace or route between 29,000 ft and 41,000 ft inclusive where aircraft are separated vertically by 1,000 ft (300 m). RVSM decreases the minimum vertical separation from 2000 ft and is being implemented world-wide on a region-by-region basis. Conventionally, minimum vertical separation requirements were 2000 ft and pressure altitude monitoring equipment, which directly measured the pressure outside the aircraft, was used to determine the pressure altitude and provided a proper tolerance to comply with the 2000 ft minimum separation requirement.

With the implementation of RVSM, older pressure altitude measuring equipment and installations may not have sufficient accuracy or reliability to meet RSVM requirements.

RVSM altitude monitoring requirements lead to increase cost for upgrading or replacing conventional air-data equipment. Accordingly, there is a need for a pressure altitude monitoring system that meets RSVM requirements without costly aircraft modifications and testing. Further, there is a need for an algorithm that uses cross compared geometric altitude and temperature to correct errors in pressure altitude measurements. Further, there is a need for a cross compared GPS altitude and temperature based synthetic pressure computation system which provides a synthetic pressure altitude and meets the RVSM requirements. Further, there is a need for the use of a cross compared geometric altitude that is suitably compensated with temperature and wind measurements, to produce a synthetic pressure altitude measurement. There is also a need for a cross compared GPS based synthetic pressure computation system that may be used as an independent monitor in a dual RVSM air-data system to help determine whether an RVSM air-data system is in error.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of generating a synthetic pressure altitude. The method includes providing a static air temperature to a data processing device. The method also includes receiving a geometric altitude from a geometric altitude sensing device and performing a numerical integration based on the static air temperature and the geometric altitude resulting in a synthetic pressure altitude. The method further includes receiving a pressure altitude from a pressure altitude sensing device, comparing the pressure altitude and the synthetic pressure altitude and generating an average of the pressure altitude and the synthetic pressure altitude. The method still further includes providing selectively, based on the comparing step, the average as output.

Another example of the invention relates to a method of determining the pressure altitude of an aircraft. The method includes providing a static air temperature to a data processing device from a temperature measuring device on the aircraft, receiving a geometric altitude from a geometric altitude sensing device, and performing a numerical integration based on the static air temperature and the geometric altitude to provide a synthetic pressure altitude. The method also includes receiving a pressure altitude from a pressure altitude sensing device, comparing the pressure altitude and the synthetic pressure altitude, and generating an average of the pressure altitude and the synthetic pressure altitude. The method further includes providing selectively, the average as output.

Yet another example of the invention relates to a pressure altitude determining system. The system includes a data processing device. The system also includes an air temperature monitor communicating air temperature data to the data processing device and a geometric altitude monitor communicating geometric altitude data to the data processing device. The data processing device carries out a numerical integration based on the air temperature data, and the geometric altitude data, to generate a synthetic pressure altitude. The synthetic pressure altitude data is generated based on a comparison between a measured pressure altitude and the computed synthetic pressure altitude.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
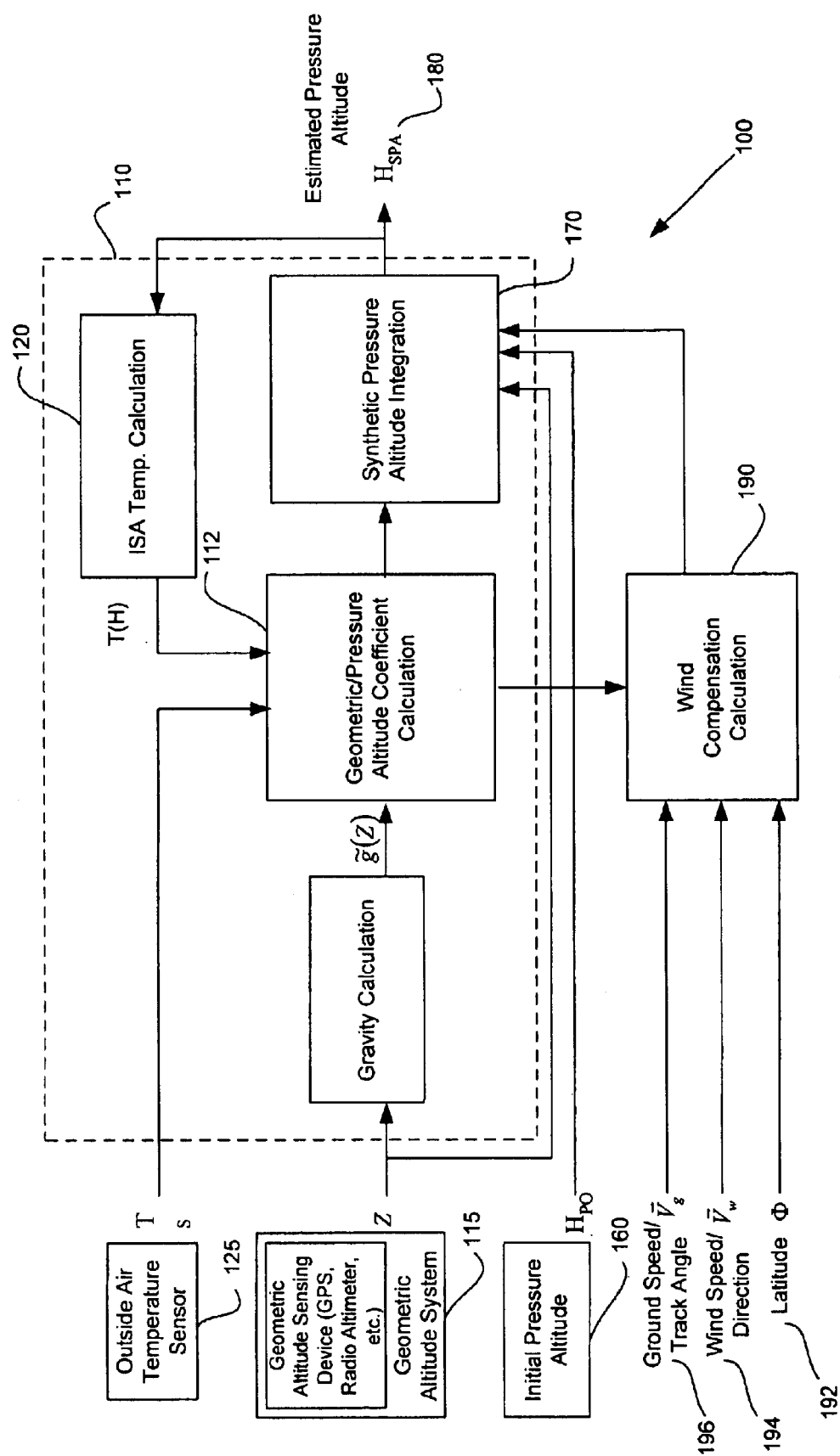
FIG. 1 is a block diagram of a synthetic pressure computation system that includes wind compensation.

Before describing, in detail the particular improved system and method, it should be observed that the invention includes, but is not limited to a novel structural combination of conventional data/signal processing components and measurement circuits, and not in the particular detailed configurations thereof. Accordingly, the structure, methods, functions, control and arrangement of conventional components and circuits have, for the most part, been illustrated in the drawings by readily understandable block representations, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Various RVSM altimetry system error (ASE) requirements from FAA guidance materials may be used to come up with statistical requirements to apply to the use of synthetic pressure altitude. For example, For Group Aircraft
  Basic RVSM Envelope requirements considering all sources of ASE are:
    The largest absolute value of the mean ASE should not exceed 80 ft (25 m)
    The largest absolute value of the mean plus three sigma ASE should not exceed 200 ft (60 m)
  The Full RVSM Envelope requirements are:
    The largest absolute value of the mean ASE should not exceed 120 ft (37 m)
    The largest absolute value of the mean plus three sigma ASE should not exceed 245 ft (75 m)
  Individual aircraft in a group should have ASE contained in ±200 ft (±60 m).
For Non-Group aircraft
  Basic RVSM Envelope requirement is:
    |Residual static source error+worst case avionics|<160 ft (50 m)
  For Full Envelope:
    |Residual static source error+worst case avionics|<200 ft (60 m)

Further, the integrity requirement provided in FAA guidance materials includes that the altimetry system failure should be less than $10^{-5}$ per hour. Also, altitude alerts should occur for ±200 ft (±60 m). Overall equipment tolerance in implementing these nominal threshold values should not exceed ±50 ft (±15 m).

To derive a basic model relating geometric and pressure altitudes, a static column of air is assumed.

Pressure altitude is a measurement of geopotential altitude which may be related to geometric altitude by $$G_0 dH = g(Z) dZ \quad (1)$$

where
  Z=geometric altitude referenced to Mean Sea Level
  H=geopotential altitude
  $G_0$=standard acceleration due to gravity=9.80665 m/s$^2$
  g(Z)=acceleration due to gravity at altitude Z.

A model for gravity in terms of latitude $\lambda$ and altitude Z may be given as:

$$g = g_0(1 + g_1 \sin^2\lambda + g_2 Z) \quad (2)$$

$g_0$=9.7803 m/s$^2$
  $g_1$=0.005296
  $g_2$=$-9.6229 \times 10^{-8}$ $m^{-1}$.

Integrating (1) using (2) yields an estimate for geopotential altitude:

$$\int_0^H dH = \int_0^Z \frac{g(Z)}{G_0} dZ \quad (3)$$

$$\hat{H}_{GEO} = (g_0/G_0)\left(1 + g_1 \sin^2\lambda + \frac{1}{2}g_2 Z\right)Z.$$

The basic relationship for modeling the static atmosphere is $$\frac{dP}{P} = -\frac{Mg}{RT} dZ \quad (4)$$

where
  P=atmospheric pressure
  T=absolute temperature, K
  M=mean molecular weight=28.9644 kg/kmol
  R=universal gas constant=8314.32 J/kmol*K.

Because equation (4) is based on a static column of air, it does not fully account for pressure and temperature that occur with horizontal motion or with changes in weather.

In the international standard atmosphere (ISA) model, geopotential or pressure altitude replaces geometric altitude in (4):

$$\frac{dP}{P} = -\frac{MG_0}{RT(H)} dH. \quad (5)$$

In this model a constant value for gravity is used along with a specific temperature profile, the so-called standard day:

$$T(H) = T_b + LH = \begin{cases} T_0 - 6.5H, & 0 \le H \le H_1 \\ T_1, & H_1 < H \le H_2 \end{cases} \quad (6)$$

where
  $H_1$=11 km
  $H_2$=20 km
  $T_0$=288.15 K
  $T_1$=216.65 K.

Equations (4) and (5) give two expressions from the incremental change in pressure as a function of changes in geometric and geopotential altitude, respectively. Pressure altitude may be estimated by relating incremental changes in pressure altitude to changes in geometric altitude:

$$\frac{g(Z)}{T(Z)} dZ = \frac{G_0}{T(H)} dH \quad (7)$$

which explicitly shows the dependence of temperature on geometric or geopotential altitude. Using (6), the RHS of (7) can be integrated easily analytically, but the LHS may be integrated numerically. Defining $\tilde{g}(Z) = g(Z)/G_0$, we have for $0 \le H < H_1$:

$$\int_{Z_{n-1}}^{Z_n} \frac{\tilde{g}(Z)}{T(Z)} dZ = \int_{H_{n-1}}^{H_n} \frac{1}{T_0 + LH} dH \quad (8)$$

$$\int_{Z_{n-1}}^{Z_n} \frac{\tilde{g}(Z)}{T(Z)} dZ = \frac{1}{L} \ln(T_0 + LH) \bigg|_{H_{n-1}}^{H_n}$$

-continued $$\ln\left(\frac{T_0 + LH_n}{T_0 + LH_{n-1}}\right) = L\int_{Z_{n-1}}^{Z_n} \frac{\tilde{g}(Z)}{T(Z)} dZ$$

$$H_n = \exp\left\{L\int_{Z_{n-1}}^{Z_n} \frac{\tilde{g}(Z)}{T(Z)} dZ\right\}[T_0/L + H_{n-1}] - T_0/L$$

$$H_n = (1 + c_n)H_{n-1} + c_n \frac{T_0}{L}$$

$$c_n = \exp\left\{L\int_{Z_{n-1}}^{Z_n} \frac{\tilde{g}(Z)}{T(Z)} dZ\right\} - 1$$

For $H_1 < H < H_2$, $T(H) = T_1$, and (7) integrates as $$\int_{Z_{n-1}}^{Z_n} \frac{\tilde{g}(Z)}{T(Z)} dZ = \int_{H_{n-1}}^{H_n} \frac{1}{T_1} dH = \frac{1}{T_1}(H_n - H_{n-1}) \quad (9)$$

$$H_n = H_{n-1} + d_n$$

$$d_n = T_1 \int_{Z_{n-1}}^{Z_n} \frac{\tilde{g}(Z)}{T(Z)} dZ$$

The integrals in (8) and (9) can be evaluated via the trapezoidal rule:

$$c_n = \exp\left\{\frac{L}{2}\left(\frac{\tilde{g}_n}{T_n} + \frac{\tilde{g}_{n-1}}{T_{n-1}}\right)(Z_n - Z_{n-1})\right\} - 1, \quad 0 \le H \le H_1 \quad (10)$$

$$d_n = \frac{T_1}{2}\left(\frac{\tilde{g}_n}{T_n} + \frac{\tilde{g}_{n-1}}{T_{n-1}}\right)(Z_n - Z_{n-1}), \quad H_1 < H < H_2$$

The initial condition, $\hat{H}_p(0)$, for the state propagation in (8) can be set either by the mean sea level pressure that a standard pressure altimeter would be set at departure from the airport or from a pressure altitude—which are generally very accurate at low altitudes. Summarizing, the following is the resultant iteration for the synthetic pressure estimate:

$$\hat{H}_P(n) = \begin{cases} (1 + c_n)\hat{H}_P(n-1) + c_n \frac{T_0}{L}, & 0 \le \hat{H}_P \le H_1 \\ \hat{H}_P(n-1) + d_n, & H_1 \le \hat{H}_P \le H_2 \end{cases} \quad (11)$$

In an exemplary embodiment, a synthetic pressure altitude estimation may be derived that incorporates wind and aircraft ground speed data which may not be compensated or captured by a static air column model. The incorporation of wind and aircraft ground speed results in the removal of some errors which may result from the use of a static air column model. Pressure altitude is derived by using estimates of geometric altitude along with corrections for wind data and temperature data. For example, consider a parcel of air whose location in a local-level (LL) coordinate frame is given by $r^L$ (derived using an East, North, Up coordinate frame). The wind velocity may be denoted as $v_w = \dot{r}^L$. The acceleration of the parcel of air may be given by the Coriolis Theorem:

$$\dot{v}_w = a_{ext}^L - 2\omega_{L1}^L \times v_w - \omega_{L1}^L \times \omega_{L1}^L \times r^L \quad (12)$$

where:
$a_{ext}^L$ = Sum of external forces per unit mass in LL frame.
$\omega_{L1}^L$ = Angular rate of the LL frame with respect to inertial in LL frame coordinates.

At high altitudes, the external forces acting on the air mass are gravity and pressure gradients. With the air density denoted as $\rho$ and normal gravity as $g_n$:

$$a_{ext}^L = g_n - \frac{1}{\rho}\nabla P. \quad (13)$$

Plumb-bob gravity may be defined as $g = g_n - \omega_{L1}^L \times \omega_{L1}^L \times r^L$, so combining (12) and (13) yields $$\dot{v}_w = g - 2\omega_{LI}^L \times v_w - \frac{1}{\rho}\nabla P. \quad (14)$$

In steady state conditions ($\dot{v}_w = 0$), equation (14) can be used to show that the winds are along pressure Isobars. Furthermore, there is a global pressure gradient from the equator to the poles that gives rise to the so-called "geostropic winds"—the west-to-east jet stream.

A vehicle flying through the air mass, may have ground velocity $v_g$ represented as:

$$v_g = \begin{bmatrix} V_{gE} \\ V_{gN} \\ \dot{Z} \end{bmatrix}.$$

The pressure change measured over time may be given by the total time derivative of pressure, P:

$$\frac{dP}{dt} = \nabla P \cdot v_g + \frac{\partial P}{\partial t} \quad (15)$$

assuming that the second term in (15) is small, since this is due to changes in weather conditions at a given location. Computing the dot product of (14) with $v_g$ and using (15) yields $$\dot{v}_w \cdot v_g = g \cdot v_g - 2(\omega_{LI}^L \times v_w) \cdot v_g - \frac{1}{\rho}\frac{dP}{dt} \quad (16)$$

The angular rate of the LL frame is composed of two components, the earth rotation rate and the transport rate due to the vehicle motion:

$$\omega_{LI}^L = \begin{bmatrix} -V_{gN}/R \\ V_{gE}/R + \Omega_e \cos\phi \\ \Omega_e \sin\phi \end{bmatrix}$$

where $R = R_e + Z$, $\phi$ is latitude, and $\Omega_e$ is the earth rotation rate. The vertical components of the wind velocity and acceleration are assumed to be zero, so $$v_w = \begin{bmatrix} V_{wE} \\ V_{wN} \\ 0 \end{bmatrix}, \dot{v}_w = \begin{bmatrix} \dot{V}_{wE} \\ \dot{V}_{wN} \\ 0 \end{bmatrix}.$$

Furthermore, the horizontal components of gravity may be ignored, so $g = [0\ 0\ -G]^T$. With these assumptions and definitions, and using the identity $(a \times b) \cdot c = (b \times c) \cdot a$, equation (16) becomes $$\frac{1}{\rho}\frac{dP}{dt} = \left[-G + \frac{2V_{gN}V_{wN}}{R} + \frac{2V_{gE}V_{wE}}{R} + 2\Omega_e V_{wE}\cos\phi\right]\dot{Z} - \quad (17)$$

$$[V_{gE}\dot{V}_{wE} + V_{gN}\dot{V}_{wN}] - 2[V_{gN}V_{wE} - V_{gE}V_{wN}]\Omega_e\sin\phi \cdot \approx$$

$$-G\dot{Z} - \dot{V}_{wa}V_g + 2V_{wc}V_g\Omega_e\sin\phi$$

In (17) the terms multiplying $\dot{Z}$ that are small, compared to gravitational acceleration, are neglected and the following definitions may be used:

$$V_{wc}V_g = V_{gE}V_{wN} - V_{gN}V_{wE} = \text{Cross Wind Speed} \times \text{Ground Speed}$$

$$\dot{V}_{wa}V_g = V_{gE}\dot{V}_{wE} + V_{gN}\dot{V}_{wN} = \text{Along Track Wind Accel} \times \text{Ground Speed} \quad (18)$$

For an ideal gas, $1/\rho = RT/MP$, which used in (17) gives an expression for the relative change in pressure as a function of the change in geometric altitude and the winds:

$$\frac{dP}{P} = \frac{Mg(Z)}{RT(Z)}dZ + \frac{M}{RT(Z)}\left[2V_{wc}V_g\Omega_e\sin\phi - \dot{V}_{wa}V_g\right]dt. \quad (19)$$

The incremental pressure change can be related to change in geopotential altitude as $$\frac{dP}{P} = -\frac{MG_0}{RT(H)}dH \quad (20)$$

Equating (19) and (20) yields $$\frac{dH}{T(H)} = \frac{\tilde{g}(Z)}{T(Z)}dZ - \frac{1}{G_0 T(Z)}\left[2V_{wc}V_g\Omega_e\sin\phi - \dot{V}_{wa}V_g\right]dt \quad (21)$$

This is the basic differential relationship that we use to combine GPS, temperature, and wind data to estimate pressure altitude. The left hand side of (21) involving pressure altitude can be integrated analytically, whereas the right hand side must be integrated numerically. Two forms of wind compensation may be used. For example, using only the cross wind terms in (21) or both the cross and along track terms:

$$F_n = \begin{cases} -2V_{wc}(t_n)V_g(t_n)\Omega_e\sin\phi(t_n), & \text{Cross-Wind Only} \\ -2V_{wc}(t_n)V_g(t_n)\Omega_e\sin\phi(t_n) + \dot{V}_{wa}(t_n)V_g(t_n), & \text{Both Terms} \end{cases} \quad (22)$$

The derivation for the wind correction (22) assumed atmospheric conditions that may not apply near the ground, therefore it may be desirable to include logic in the integration of equation (21) that computes the wind compensation at altitudes greater than some threshold, $H_w$, where a range of values for $H_w$ may be, in an exemplary embodiment, 5,000 to 25,000 feet. The synthetic pressure estimation algorithm with wind corrections can be summarized as follows.

$$\hat{H}_P(n) = \begin{cases} (1 + c_n)\hat{H}_P(n-1) + c_n\frac{T_0}{L}, & 0 \leq \hat{H}_P \leq H_1 \\ \hat{H}_P(n-1) + d_n, & H_1 < \hat{H}_P < H_2 \end{cases} \quad (23)$$

$$c_n = \exp\left\{\frac{L}{2}\left(\frac{\tilde{g}_n}{T_n} + \frac{\tilde{g}_{n-1}}{T_{n-1}}\right)(Z_n - Z_{n-1})\right\} - 1, \quad 0 \leq H \leq H_w$$

$$c_n = \exp\left\{\frac{L}{2}\left(\frac{\tilde{g}_n}{T_n} + \frac{\tilde{g}_{n-1}}{T_{n-1}}\right)(Z_n - Z_{n-1}) + \right.$$

$$\left. \frac{L}{2}\left(\frac{F_n}{T_n} + \frac{F_{n-1}}{T_{n-1}}\right)(t_n - t_{n-1})\right\} - 1, \quad H_w \leq H \leq H_1$$

$$d_n = \frac{T_1}{2}\left\{\left(\frac{\tilde{g}_n}{T_n} + \frac{\tilde{g}_{n-1}}{T_{n-1}}\right)(Z_n - Z_{n-1}) + \right. \quad (24)$$

$$\left. \frac{L}{2}\left(\frac{F_n}{T_n} + \frac{F_{n-1}}{T_{n-1}}\right)(t_n - t_{n-1})\right\}, \quad H_1 \leq H \leq H_2$$

Referring now to FIG. 1, a block diagram of a system 100 for generating synthetic pressure altitude and for providing a corrected pressure altitude as an output of system 100, is depicted. System 100 includes a data processing device which may be used to carry out the operation of synthetic computation in block 110. The synthetic pressure computation algorithm receives a geographic height estimate Z from a geometric altitude system 115 which may include but is not limited to a GPS receiver. In other embodiments, either a single GPS unit may be used or more than two GPS receiver units may be used. Further, in alternative embodiments, other geometric height estimators or monitors may be used, including, but not limited to, inertial navigation systems (INS), radar systems, radio altimeters, etc. A static air temperature sensor 125 sends an approximation of static air temperature ($T_S$) to a geometric/pressure altitude coefficient calculator 112. An ISA air temperature model calculation 120 provides a temperature estimate (T(H)) to coefficient calculator 112. Further, a pressure altitude monitor 160 provides an estimate of the initial pressure altitude $H_{P0}$ to a synthetic pressure altitude integrator 170. Initial pressure altitude $H_{P0}$ is used for providing initial conditions for the numerical integration. Synthetic pressure computation altitude integrator 170 may utilize equations (23) and (24) for providing the numerical and analytical integration which results in the generation of a synthetic pressure altitude $H_{SPA}$ 180. Equations (23) and (24) incorporate wind speed compensation calculations 190. Wind speed calculator 190 receives measurements of latitude $\Phi$ 192, wind speed/directions $\vec{V}_w$ 194 and ground speed/track angle $\vec{V}_g$ 196. Also, wind compensation calculator 190 receives the geometric/pressure altitude coefficient calculator from calculator 112. The resultant wind compensation calculation is provided to integrator 170.

In a particular exemplary embodiment, use of the wind speed measurements may not be necessitated if the error requirements are not significant. Otherwise, ground speed and wind speed are used to improve the pressure altitude estimates.

Air data systems provide pressure altitude that is critical for an aircraft to fly at an assigned altitude. As compared to traditional air data systems, RVSM-quality air data sensors are more accurate both with the measurement of static air pressure as well as the characterization of the effects of airflow on the aircraft that distort the measurement. RVSM air data systems, as with their traditional counterpart, rely on cross comparison of dual systems to achieve a high level of integrity. Integrity is concerned with the system's ability to ensure that a certain level of error is not exceeded to a very low probability, whether it is the case that the system components are working correctly or not. In most instances, the integrity performance is dominated by the introduction of an undetected fault.

An example of integrity requirements for RVSM operation may be:

| TVE | Probability |
|---|---|
| >300 ft | <2 × 10⁻³ |
| >500 ft | <3.5 × 10⁻⁶ |
| >650 ft | <1.6 × 10⁻⁷ |
| 950–1050 ft | <1.7 × 10⁻⁸ |

Figure 2:
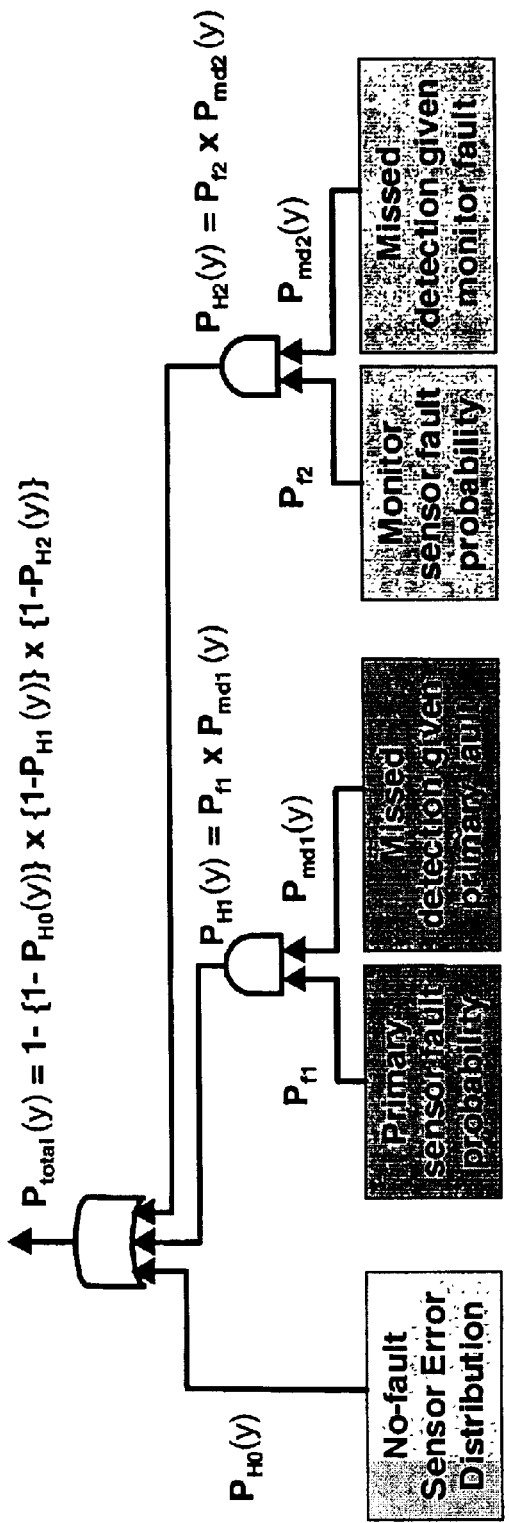
FIG. 2 is an exemplary diagram of an integrity level computation scheme.

As depicted in FIG. 2, an analysis of the integrity level should take into consideration both the "no-fault" and the "faulted" conditions, the latter must be considered separately for a fault in either sensor. The "faulted" condition, which is the more predominant of the two, is made up of $P_{fault}$, the intrinsic failure rate of either sensor, and the missed detection rate of the cross comparison scheme $P_{missed\ detection}$. The probability of the no fault condition may be given as $P_{no\ fault}$.

Figure 3:
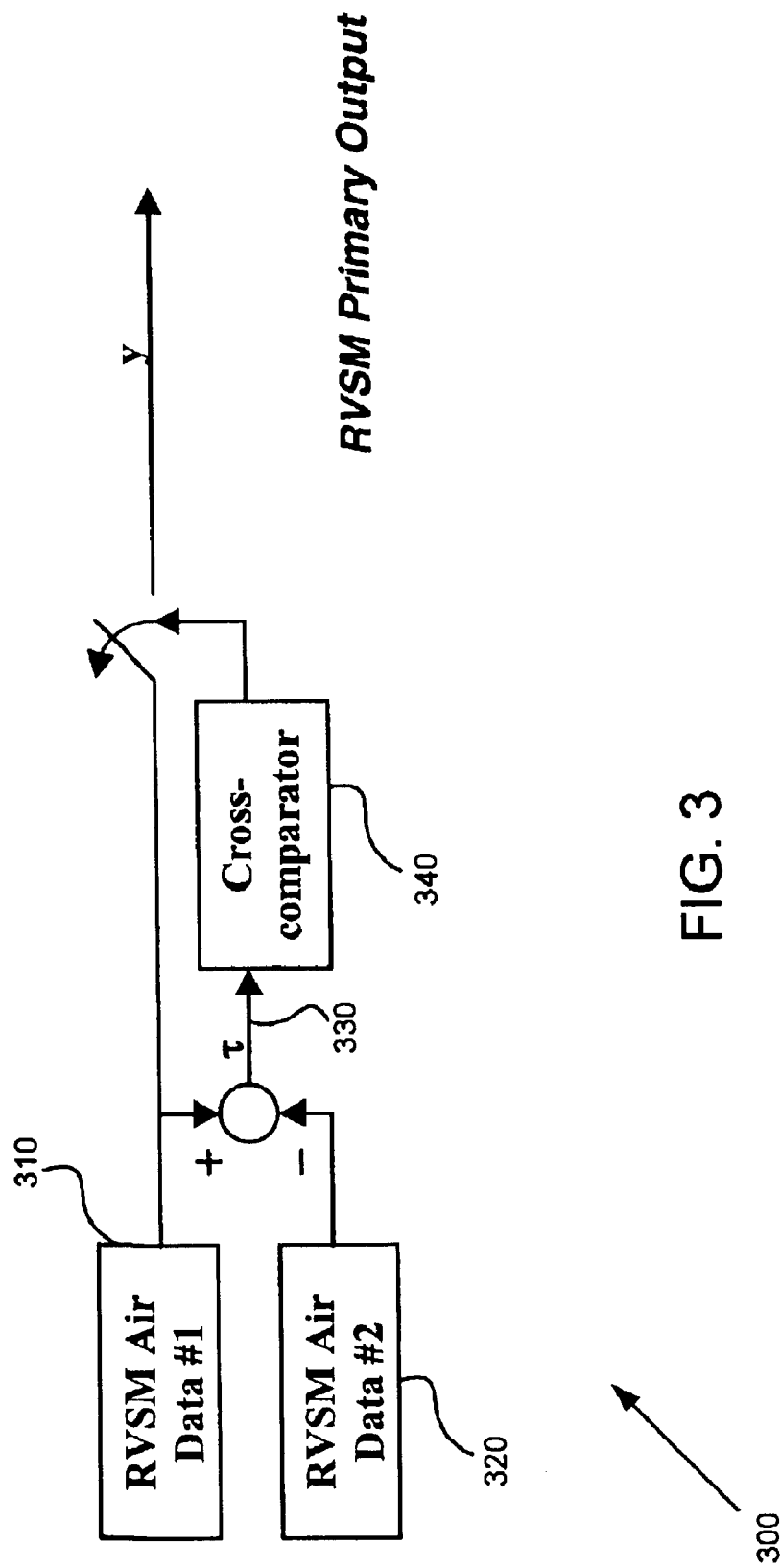
FIG. 3 is a diagram of a conventional RVSM cross compare system.

In the traditional dual-RVSM cross compare scheme 300 (FIG. 3), integrity of the data is assured by differencing the output of each RVSM sensor, RVSM Air Data #1 310 and RVSM Air Data #2 320, and comparing the absolute value of this test statistic (τ) 330 against a preset threshold at cross comparator 340. The preset threshold is designed at a level that yields a tolerable rate of false alerts (typically one in 100,000 tests per hour). For this particular threshold setting and this particular output configuration for the reported altitude y, a missed detection probability ($P_{missed\ detection}$) can be derived for the cross compare monitoring scheme and used in the fault-tree analysis of FIG. 2 to ascertain the overall integrity level.

Figure 4:
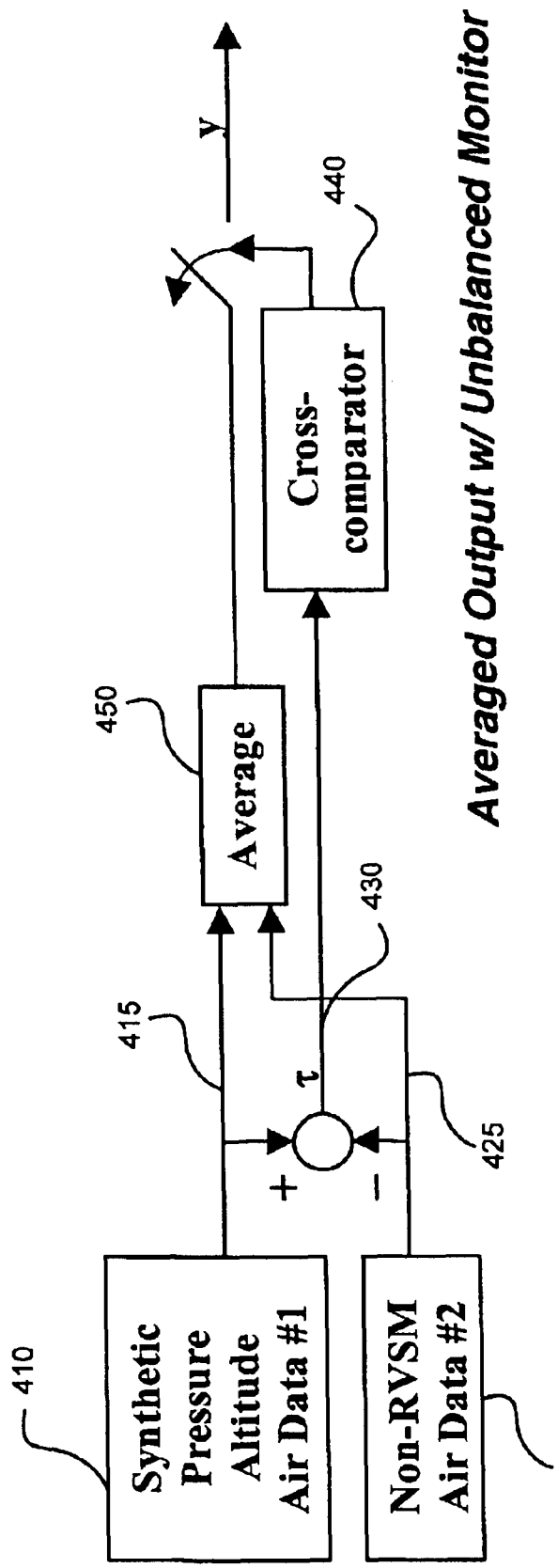
FIG. 4 is an exemplary diagram of a synthetic pressure altitude cross compare system.

In an exemplary cross comparison system 400 (FIG. 4), a synthetic pressure altitude ADC 410 is combined with a non-RVSM ADC 420 cross compare monitor. The test statistic (τ) 430 is similarly generated by differencing the outputs of the Synthetic Pressure Altitude 415 and the non-RVSM pressure altitude 425. A fault is indicated if the absolute value of the test statistic (τ) 430 exceeds a detection threshold that is set in cross comparator 440 to meet the same false alert rate requirements as above. The output of this configuration is made up of some weighted average of the two component outputs compared at averaging block 450. In one embodiment of this system, the weights are evenly distributed (one-half for each output in the averaging). Here again, a missed detection probability ($P_{missed\ detection}$) can be derived for this particular cross compare monitoring scheme and used in the fault-tree analysis of FIG. 2 to ascertain the overall integrity level.

The following notational definitions may be used for carrying out an exemplary missed detection analysis:

h=True pressure altitude
$a_x$=Output of primary sensor
$a_y$=Output of monitor (secondary) sensor
x=Uncorrelated error of the primary sensor (unbiased gaussian distribution)
y=Uncorrelated error of the monitor sensor (unbiased gaussian distribution)
b=Fully correlated error between primary and monitor sensors (unbiased gaussian distribution)
f=Flight technical error (unbiased gaussian distribution)
$\sigma_i$=Standard deviation of the gaussian probability density associated with parameter i Var( )=Variance operator
Cov( )=Covariance operator
ε=Bias error due to a sensor fault An example of a missed detection analysis for dual RVSM ADC may be carried out as shown in the following analysis: Statistical relationship between Test Statistic and Total Vertical Error:

$a_x = h + x + b$ $a_y = h + y + b$

Test Statistic=$(a_x - a_y)$

Alert Threshold=$4\sqrt{Varx + Vary}$

Total Vertical Error=$a_x + f$

Var(Test Statistic)=Var $(a_x - a_y)$=Varx+Vary

Var(Total Vertical Error)=Varx+Varb+Varf

Cov(TotalVerticalError, TestStatistic)=Varx $\sigma_x$=35 ft, $\sigma_y$=35 ft, $\sigma_b$=35 ft, $\sigma_f$=35 ft $$\text{Probability Density Covariance} = \begin{bmatrix} 2 \cdot (35)^2 & (35)^2 \\ (35)^2 & 3 \cdot (35)^2 \end{bmatrix}$$

$$= \begin{bmatrix} 2,450 & 1,225 \\ 1,225 & 3,675 \end{bmatrix} ft^2$$

Alert Threshold=198 ft

Total Vertical Error (σ)=61 ft

When a sensor fault is introduced:

$a_x = h + x + \varepsilon$ $a_y = h + y + b$

Mean(Test Statistic)=Mean$(a_x - a_y)$=ε

Mean(Total Vertical Error)=Mean$(x + b + \varepsilon + f)$=ε

Suppose that the bivariate (test statistic and total vertical error) probability density function for a fault ε is given by $F_{xy}(x,y; \varepsilon)$, we are interested in evaluating this under the condition that the absolute value of the test statistic does not exceed the prescribed threshold τ.

$$F_y(y; \varepsilon) = \int_{-\tau}^{\tau} F_{xy}(x, y; \varepsilon) dx \quad (25)$$

Finally, the probability that the total vertical error exceeds |Y|, conditioned on the fact that the absolute value of the test statistic is less than the threshold τ, for a given fault ε, may be given by.

$$F_t(Y; \varepsilon) = \int_{-\infty}^{\infty} F_y(y; \varepsilon) dy - \int_{-Y}^{Y} F_y(y; \varepsilon) dy \quad (26)$$

To determine the missed detection probability, the largest value of this probability (worst-case) under any fault ε should be assessed:

$$P_{\text{missed detection}}(Y) = \max_{\varepsilon} \{F_{\varepsilon}(Y; \varepsilon)\} \tag{27}$$

This missed detection probability may then be used to determine the overall integrity via the fault tree of FIG. 2. The no fault probability may be evaluated from (25) and (26) for $\epsilon=0$.

These computations may be carried out to validate the design by showing that the achievable integrity meets the requirements. They are analytical in nature and not computed real-time during flight operation.

In flight operation, only the test statistic is computed and its absolute value tested against the prescribed threshold to ensure that no fault has been detected. Independent of that, the output is a weighted average of the outputs of the Synthetic Pressure Altitude ADC and the non-RVSM monitor.

An example of a missed detection analysis for monitoring of synthetic pressure ADC may be carried out as shown in the following analysis. The following is an exemplary statistical relationship between Test Statistic and Total Vertical Error:

$a_x = h + x$ $a_y = h + y + b$

Test Statistic $= (a_x - a_y)$

Alert Threshold $= 4\sqrt{\text{Var}x + \text{Var}y + \text{Var}b}$

Total Vertical Error $= \left(\frac{1}{2}a_x + \frac{1}{2}a_y\right) + f$

Var(Test Statistic) $= \text{Var}(a_x - a_y) = \text{Var}x + \text{Var}y + \text{Var}b$ Cov (Total Vertical Error, Test Statistic) $= \frac{1}{2}\text{Var } x - \frac{1}{2}\text{Var } y - \frac{1}{2}\text{Var } b$ $\sigma_x = 50$ ft, $\sigma_y = 70$ ft, $\sigma_b = 70$ ft, $\sigma_f = 35$ ft $$\text{Probability Density Covariance} = \begin{bmatrix} 50^2 + 70^2 + 70^2 & \frac{1}{2}(50^2 - 70^2 - 70^2) \\ \frac{1}{2}(50^2 - 70^2 - 70^2) & \frac{1}{4}(50^2 + 70^2 + 70^2) + 35^2 \end{bmatrix}$$

$$= \begin{bmatrix} 12{,}300 & -3{,}650 \\ -3{,}650 & 4{,}300 \end{bmatrix} \text{ft}^2$$

Alert Threshold $= 444$ ft

Total Vertical Error $(\sigma) = 66$ ft

When a sensor fault is introduced (in the primary sensor):

$a_x = h + x + \epsilon$ $a_y = h + y + b$

Mean(Test Statistic) $= \text{Mean}(a_x - a_y) = \epsilon$

Mean (Total Vertical Error) $= \text{Mean}\left\{\frac{1}{2}(x + \varepsilon) + \frac{1}{2}(y + b) + f\right\} = \frac{1}{2}\varepsilon$ Note that for a monitor fault, the sign of either the Mean (Test Statistic) or Mean (Total Vertical Error) will be reversed, but not both.

This evaluation may be carried out in the same manner as shown before for the Dual RVSM case.

Figure 5:
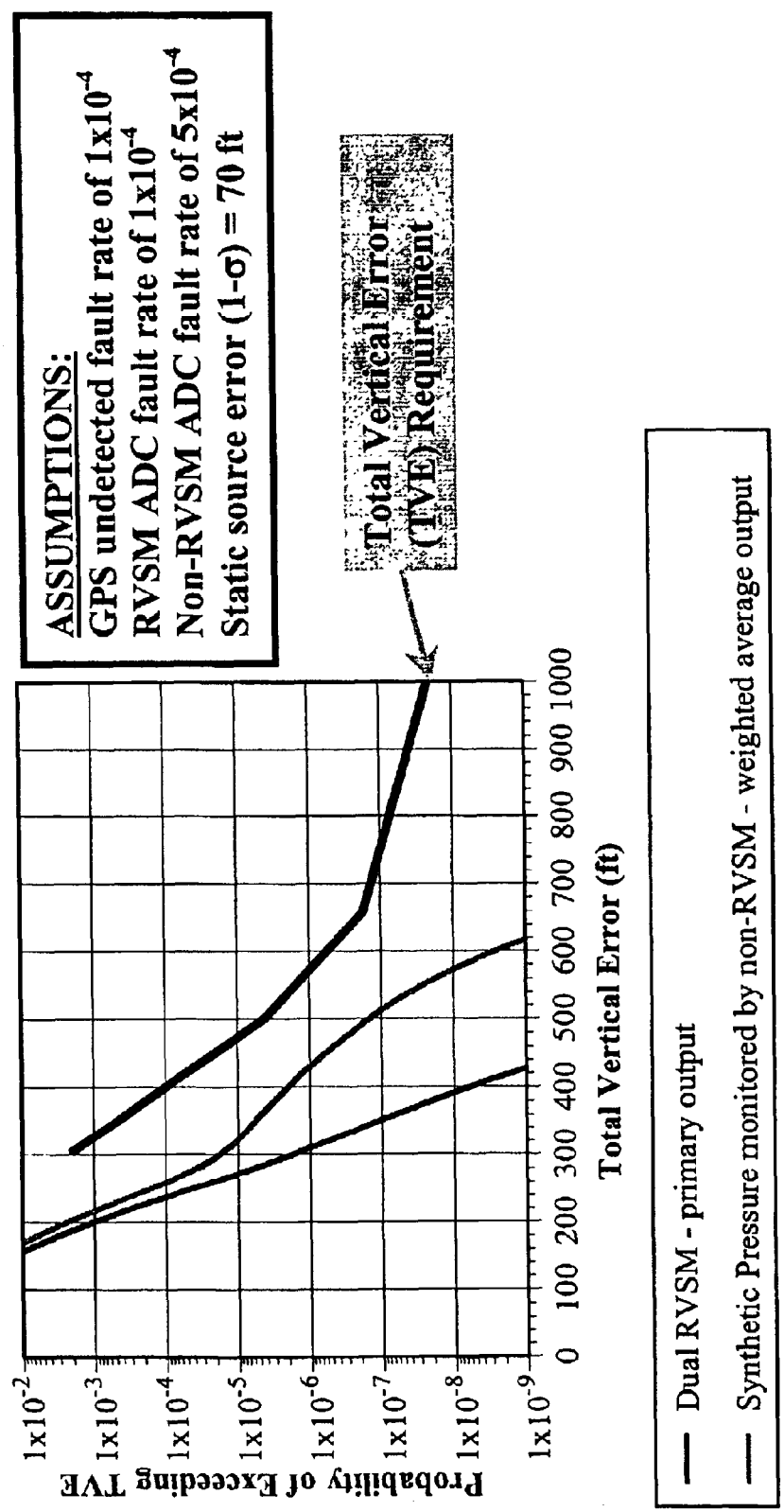
FIG. 5 is an exemplary depiction of total vertical error requirements.

In a comparison of integrity performance between the two schemes, it should be apparent that the cross compare monitoring of the Dual-RVSM has better integrity than the Synthetic Pressure RVSM with a non-RVSM monitor. However, for the given assumptions, the latter still meets the requirements (see FIG. 5).

Figure 6:
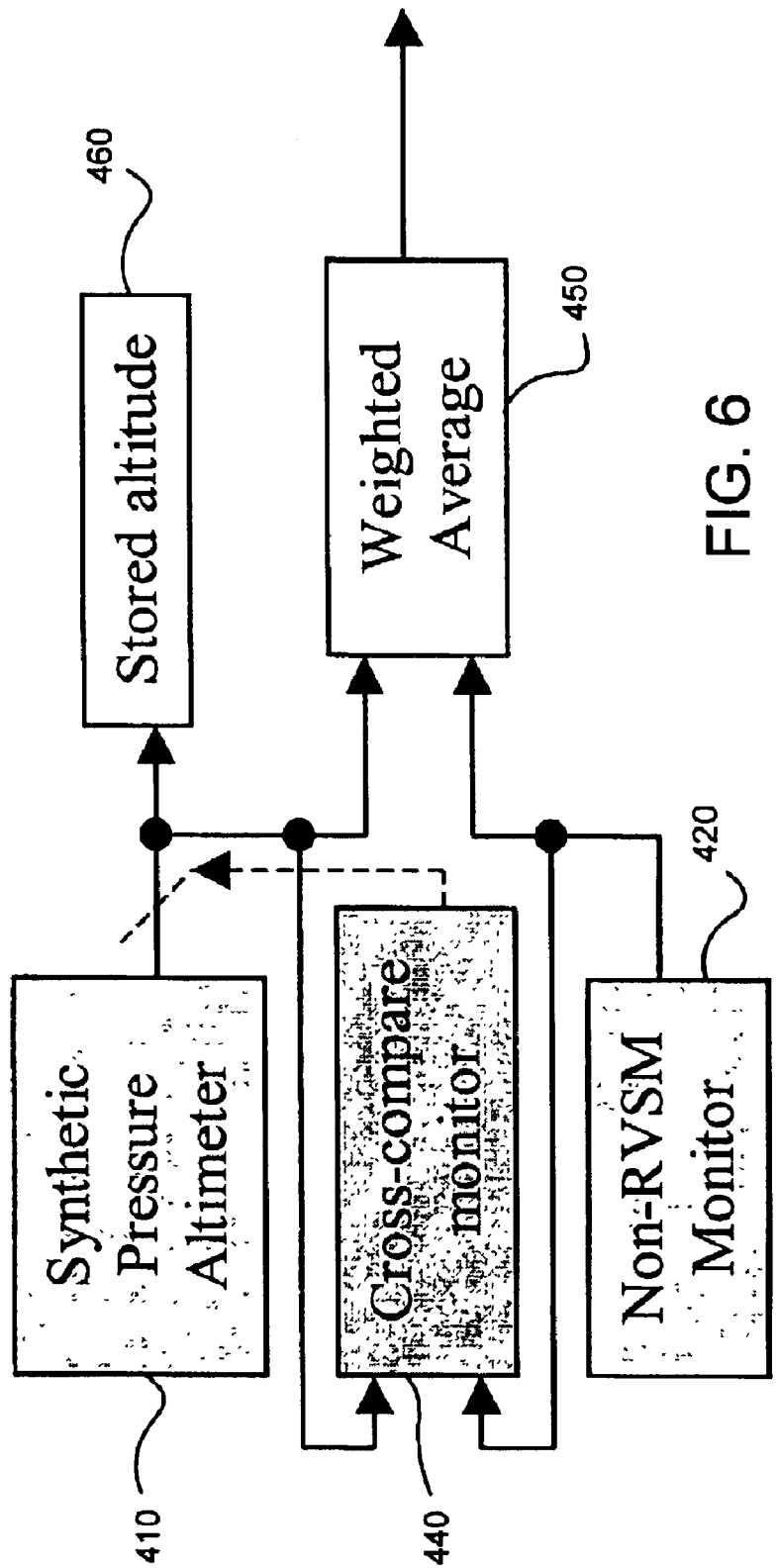
FIG. 6 is an exemplary diagram of a synthetic pressure altitude cross compare system.
Figure 7:
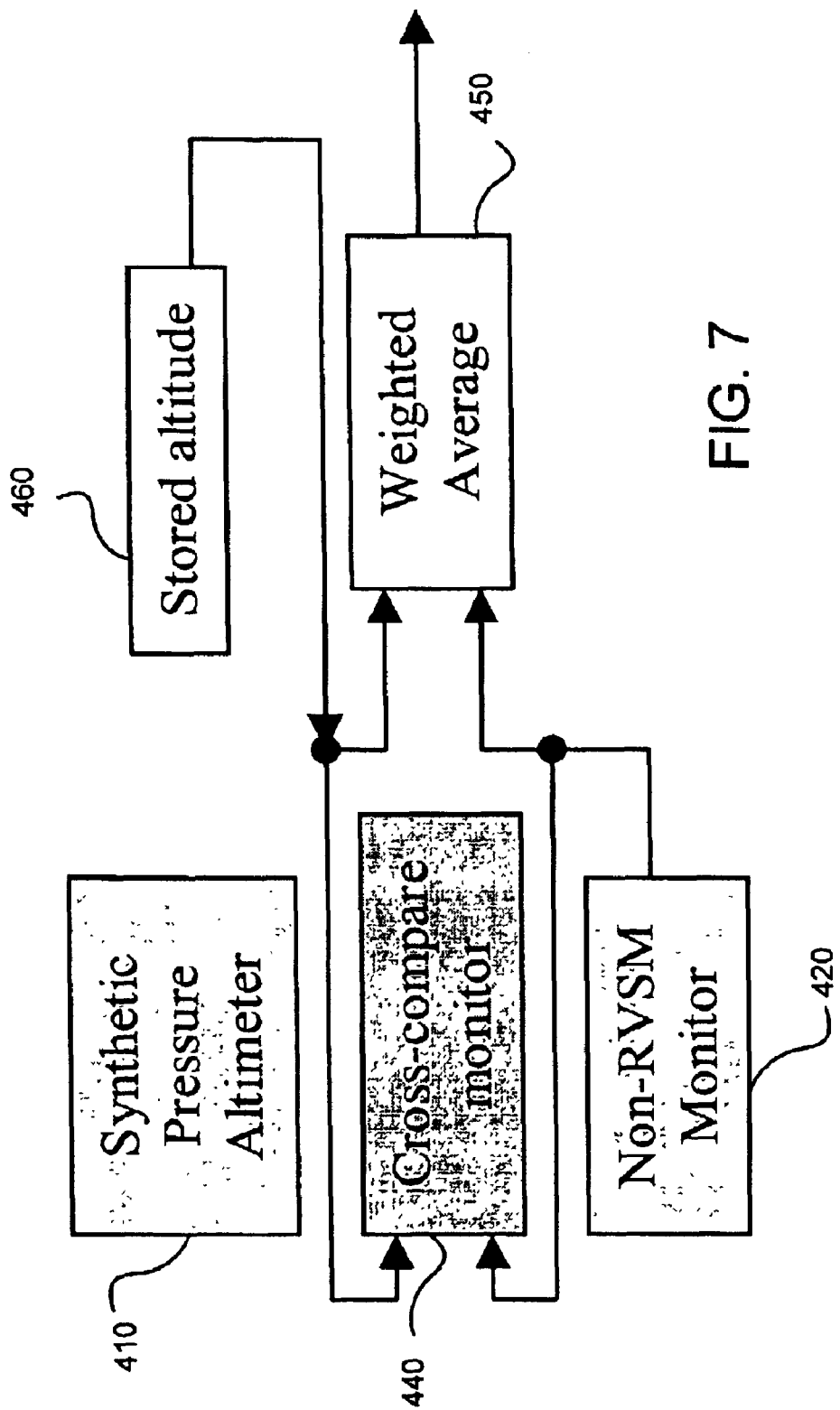
FIG. 7 is an exemplary diagram of the synthetic pressure altitude cross compare system of FIG. 6.

Synthetic Pressure Altitude may be derived from GPS altitude, static air temperature, and wind measurements. Of these components, the sensor with the lowest availability rate is typically the GPS signal-in-space. It may have an accepted fault rate of $10^{-4}$ per hour. Since the method of detection of a GPS fault used here may not, in an exemplary embodiment, be based on Receiver Autonomous Integrity Monitoring (RAIM) methodology used by the receiver for navigational integrity, the system may not be subject to the constraints of RAIM, i.e. poor availability with loose protection levels. At the same time, the system may not have access to mechanisms that would help isolate or exclude the fault. In this exemplary embodiment of integrity monitoring for the Synthetic Pressure Altimeter (FIG. 6), the system may be configured to stop using GPS upon the detection of a fault and hold the Synthetic Pressure altitude at the last known good value as stored during GPS non-fault periods (FIG. 6) in altitude storage 460 (FIG. 7). This assumes the aircraft is holding at the assigned altitude.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the exact algorithmic formulations used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of generating a synthetic pressure altitude, comprising:

providing a static air temperature to a data processing device;

receiving a geometric altitude from a geometric altitude sensing device;

performing a numerical integration based on the static air temperature and the geometric altitude resulting in a synthetic pressure altitude;

receiving a pressure altitude from a pressure altitude sensing device;

comparing the pressure altitude and the synthetic pressure altitude;

generating an average of the pressure altitude and the synthetic pressure altitude; and providing selectively, based on the comparing step, the average as output.

2. The method of claim 1, wherein the comparing step comprises finding the difference between the pressure altitude and the synthetic pressure altitude.

3. The method of claim 2, wherein the comparing step comprises comparing the absolute value of the difference with a predetermined threshold.

4. The method of claim 1, wherein the numerical integration is derived from a trapezoidal rule.

5. The method of claim 1, wherein the average is a weighted average.

6. The method of claim 1, wherein the geometric altitude is generated from global positioning system (GPS) signals.

7. The method of claim 1, wherein the geometric altitude is generated from a radar altimeter.

8. The method of claim 1, wherein the result of the numerical integration is a synthetic pressure altitude.

9. The method of claim 1, further comprising:

using a stored altitude as the synthetic pressure altitude.

10. A method of determining the pressure altitude of an aircraft, comprising:

providing a static air temperature to a data processing device from a temperature measuring device on the aircraft;

receiving a geometric altitude from a geometric altitude sensing device;

performing a numerical integration based on the static air temperature and the geometric altitude to provide a synthetic pressure altitude;

receiving a pressure altitude from a pressure altitude sensing device;

comparing the pressure altitude and the synthetic pressure altitude;

generating an average of the pressure altitude and the synthetic pressure altitude; and providing selectively, the average as output.

11. The method of claim 10, wherein the comparing step comprises finding the difference between the pressure altitude and the synthetic pressure altitude.

12. The method of claim 11, wherein the comparing step comprises comparing the absolute value of the difference with a predetermined threshold.

13. The method of claim 10, wherein the numerical integration is derived from a trapezoidal rule.

14. The method of claim 10, wherein the average is a weighted average.

15. The method of claim 10, wherein the geometric altitude is generated from global positioning system (GPS) signals.

16. The method of claim 10, wherein the geometric altitude is generated from a radar altimeter.

17. The method of claim 10, further comprising:

using a stored altitude as the synthetic pressure altitude.

18. The method of claim 10, wherein the pressure altitude is compared to a second measured pressure altitude.

19. A pressure altitude determining system, comprising:

a data processing device;

an air temperature monitor communicating air temperature data to the data processing device; and a geometric altitude monitor communicating geometric altitude data to the data processing device;

wherein the data processing device carries out a numerical integration based on the air temperature data, and the geometric altitude data, to generate a synthetic pressure altitude;

the synthetic pressure altitude data being generated based on a comparison between a measured pressure altitude and the computed synthetic pressure altitude.

20. The system of claim 19, further comprising:

pressure altitude monitor communicating measured pressure altitude to the data processing device; and pressure altitude measurement correction routine that uses the output of the numerical integration to correct a measured pressure altitude.

21. The system of claim 20, further comprising:

a wind velocity correction system used to provide a wind correction to the synthetic pressure altitude.

* * * * *